ically reduced as only the labels need be carried in inventory. Thus, it is one object of the present invention to provide a method and apparatus for applying labels to cartons.

Two patents which relate specifically to the labeling of egg cartons are U.S. Pat. 3,396,895 and U.S. Pat. 3,562,-997, both of which were issued to D. L. Pearl et al. on Aug. 13, 1968 and Feb. 16, 1971, respectively. It is another object of the present invention to provide a method and apparatus for applying labels which is an improvement over the method and appartus disclosed in said patents.

One disadvantage to labeling methods and apparatus heretofore used is that they are not readily adaptable to be used in line with the various egg carton filling and closing machines in current use by most packers and processors. Accordingly, it is still another object of the present invention to provide a carton labeling apparatus which can be placed in line and adapted to currently used filling and closing machines.

A further object of the present invention is to provide label applying apparatus which is less complex and more reliable than labeling machines heretofore used.

The accomplishment of the above stated and other objects by the present invention will become apparent to those skilled in the art from the following Summary of the Invention, Description of the Drawings, and Description of the Embodiments.

Summary of the Invention

In its broadest aspect, the present invention is a method of applying film-like material to an object comprising the steps of conveying an object in a predetermined path; suspending the free end of an indeterminate length of a film-like material in the path of said object; gripping the free end of said film between a movable surface and an object; and, continuing the conveying of said object while additional film is gripped between the movable surface and the object until the desired length of film has been applied to the surface of said object. When either the surface of the object or the film-like material is coated with a heat activatable adhesive, the method of the invention includes heating the movable surface so that when the free end of the film is gripped between the movable surface and the object, the film is adhered to the surface of the object. The method of the invention may also include severing the film by placing cuts in the edge thereof at predetermined intervals and then stopping the movement of the film at said intervals whereby the continued movement of the object with the film adhered thereto will snap the film at the cut.

The apparatus of the present invention comprises means for conveying an object to which film-like material is to be applied; means for guiding said film-like material to a position over said conveying means where the free end of said material is at least partially in the path of said object on said conveying means; and, movable surface means adjacent said free end whereby when an object traveling on said conveying means strikes said free end, said free end will be gripped between the object and the movable surface so that the continued motion of the object will draw the film-like material from its source and apply it to the object. The apparatus may also include means whereby the movable surface will apply uniform pressure to the film and object.

In a more limited sense, the apparatus for the present invention comprises a conveyor; a horizontal supporting plate having on its upper surface a film guiding track and on its lower surface an object guiding track, said plate being pivotally and adjustably positioned above said conveyor; a rotatable belt adjustably mounted at one end of said plate, the height above said conveyor of the lower run of said belt being slightly less than the height of the object; and a source of a continuous length of film whereby when said film is placed in said film guide track so that the free end of the film hangs in the space between said plate and said belt and in the path of an object on said conveyor, the film upon being struck by the object will become gripped between the belt and the object. When the film-like material is an oriented thermoplastic film having information printed upon its surface, the apparatus may include means to heat said rotatable belt, means to put a cut in one edge of said film, means for stopping the movement of said film, and means responsive to information on said film to actuate said stopping and said cutting means.

DESCRIPTION OF THE DRAWINGS

In the drawings which are attached hereto and made a part of this specification.

PREFERRED EMBODIMENTS

(1) Description of the apparatus

Figure 1:
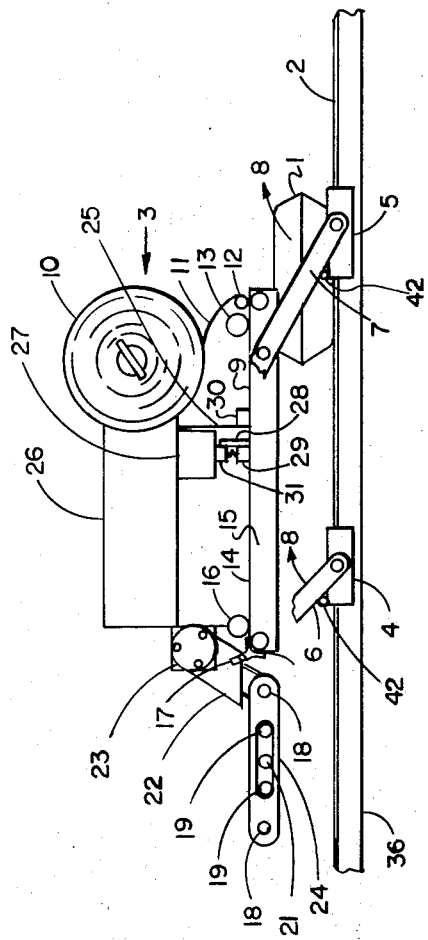
FIG. 1 is a side elevation view looking from the right side of apparatus which is a preferred embodiment of the subject invention.
Figure 2:
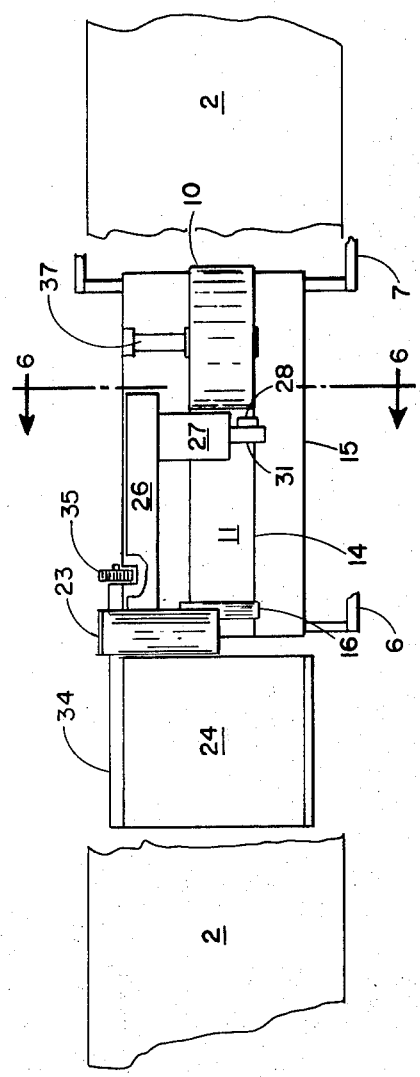
FIG. 2 is a top plan view of the apparatus shown in FIG. 1.

Referring first to FIG. 1, an object 1, which is preferably an egg carton, is shown on conveyor belt 2. The conveyor belt 2 may also be any other conveyor means such as driven rollers or the like.

Figure 4:
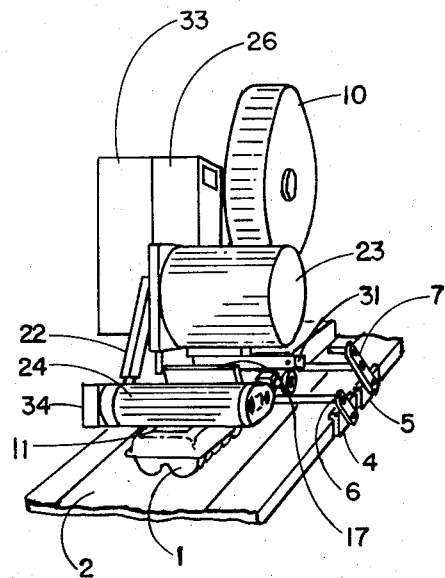
FIG. 4 is a perspective view of the apparatus of FIG. 1 looking from the front thereof.
Figure 4A:
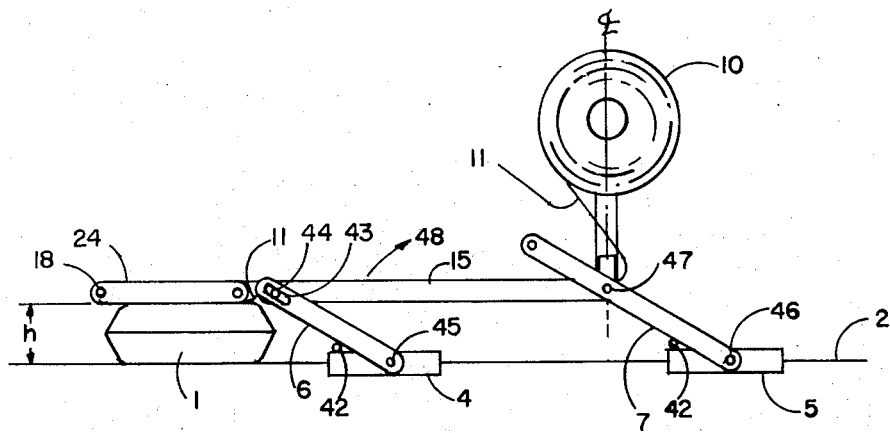
FIG. 4a is a right side elevation view thereof showing only the pivotal support for the apparatus of the subject invention.
Figure 5:
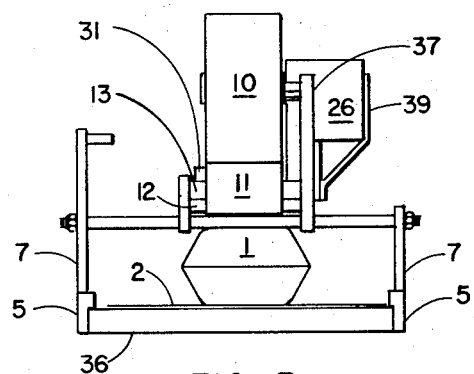
FIG. 5 is a front elevation view of the apparatus of FIG. 1.
Figure 6:
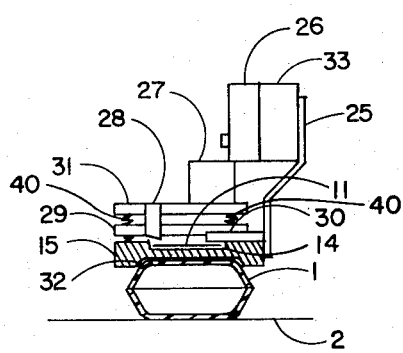
FIG. 6 is a sectional view looking along line 6—6 of FIG. 2.

Above the object 1 is plate 15 which includes film guiding means 14 or the film track and object guiding means 32 or object guiding track (see FIG. 6). Plate 15 is supported by pivotally mounted arms 6 and 7 which are broken away in the drawing of FIG. 1 but can also be seen completely in FIGS. 4, 4a, and 5. The arms 6 and 7 are held by pivot supports 4 and 5 which may be clamped onto the sides of the conveyor track as shown in FIGS. 4, 4a, and 5. The arms 6 and 7 support the entire apparatus of the present invention and the pivot support means 4 and 5 are readily adaptable to any exit conveyor of any egg carton packing machine or any container loading device. Adjustable stops 42 limit the rotation of the pivotally mounted arms 6 and 7 and enable the height of plate 15 above the belt to be adjusted for any height object. Also, if, for instance, an egg packer who is using the apparatus of the present invention wishes to run cartons through without being labeled, he may simply rotate the arms 6 and 7 in the direction of arrows 8 and thereby lift the height of the apparatus above the egg cartons so that none passing through will be labeled. This is a distinct advantage over prior art labeling apparatus since the present apparatus may be quickly put out of the way without the need of disassembling anything or making any changes to the path of the conveyor at the packing machine exit.

Referring now to FIGS. 1, 2, 3, and 6, the roll of thermoplastic labels 10 is shown carried by supporting arm 37 which is connected to plate 15. The roll of labels 10 is the source of thermoplastic film-like material, and may be a roll as shown or can be a magazine of folded film or the like. As the strip or length of film 11 leaves roll 10 it passes around guide roller 12 and under hold down roller 13 as it is fed into film guide track 14. Hold down roller 13 and roller 16 both have anti-reversing bearings to avoid film backlash. Film guide track 14 extends the entire length of plate 15 and in the initial loading or threading of the apparatus, a free end of the film 11 is left in the path of object 1 as shown in FIG. 1. Pivotally mounted guide 17 acts to hold the film in place as the free end is suspended in the path of object 1. This operation will be explained in greater detail hereinafter.

Still referring to FIGS. 1, 2, 3, and 6, film sensing means 30 is shown which will respond to information on the film 11. In the present embodiment, sensing means 30 is a photoelectric cell which will be actuated by the clear or unprinted space between labels. Since the thermoplastic film is transparent and is made opaque only by the printed label, there is a clear or transparent region between labels. Depending upon the wdth of this transparent area, the distance between knife 28 and photoelectric cell 30 can be adjusted. If the spacing is narrow, e.g., approximately ¼ inch, then knife 28 and photoelectric cell 30 will be transversely aligned. In this embodiment, knife 28 must be upstream from the film stopping means 29.

When the beam from photoelectric cell 30 is completed by a clear space in the film 11, an electric signal is sent to solenoid 27 which then actuates driving knife blade 28 downwardly to put a cut in the film; and, at the same time, resiliently mounted braking arm 29 or film stopping means is also actuated to stop the movement of the film. The lower surface of braking arm 29 is preferably provided with a thin strip of soft gripping material such as sponge rubber or the like. This arm is resiliently mounted by springs 40 to driving bar 31. Driving bar 31 has connected to it knife blade 28 and driving bar 31 is directly connected to solenoid 27. Solenoid 27 is conventional as is also photoelectric cell 30 and the electric circuitry is well understood by those in the art and is not reproduced here. The circuit wiring is included in control box 26 which is supported by supporting panel 25 and bracket 39. As stated before, the signal from photoelectric cell 30 actuates the solenoid 27 which makes a single stroke through driving bar 31 which forces braking arm 29 against the film and knife blade 28 to cut a notch into the film 11. After making the downward stroke, the solenoid 27 and members 31 and 29 being spring loaded, all return to their original position. If another type of severing means is desired, a continuous perforating knife can be substituted for the relatively short cutting blade 28 shown in FIG. 6 and a number of small cuts can be made transversely across the film.

After leaving the brake 29, the film 11 continues in the track 14 and passes under hold down roller and perforator 16. The perforating operation is optional, but when heat shrinkable thermoplastic film is used and placed across a cavity in the container, it is desirable that a deflation hole be made in the film so that air may escape and not tend to balloon out the shrunken film. To accomplish the perforations, a single band of needles spaced around the periphery of roller 16 about 45 degrees apart is used. These put minute pin holes in the film to act as deflation holes.

After leaving roller 16, the film 11 passes under pivotally mounted guide arm 17 which rests upon the film and holds it in the path of the object 1. Also, pivoting guide 17 holds the free end of the film away from heated belt 24 so that the film will not shrink prematurely. Downline from the free end is the movable surface 24 or the rotatable belt. The belt is carried by supporting arm 34 which is adjustably mounted by means of nut 35 to the plate 15. (See FIG. 3). In the preferred embodiment, the belt 24 is made of a heat resistant, non-sticky material such as Teflon and is continuously rotated so that hot spots will not develop on the surface of the belt 24. To accomplish the continuous rotation, drive motor 23 is used to drive the motor through enclosed chain 22. A housing 38 is provided as a guard. The motor 23 is mounted to supporting panel 25. Heaters 19 which are preferably electrical resistance heaters of the Cal-rod type are provided to heat the belt, and rheostat 21 adjusts the amount of electric current flowing to the heaters 19 to control the temperature thereof. The belt 24 is placed around driven rollers 18.

DESCRIPTION OF THE METHOD

Figure 3:
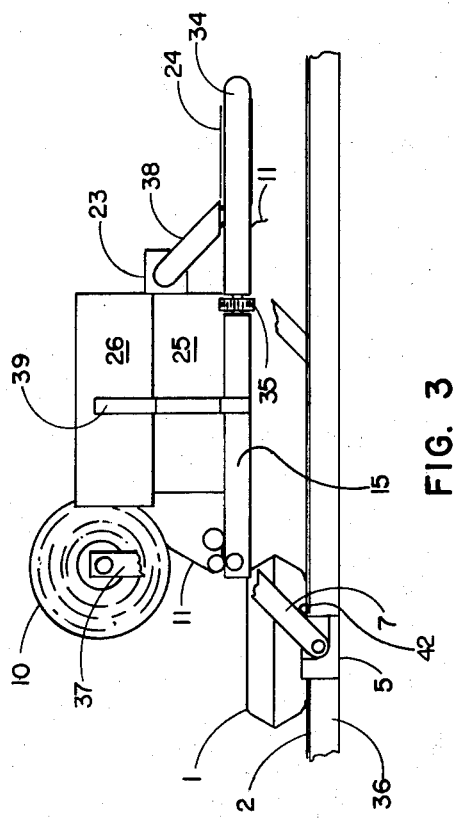
FIG. 3 is a left side elevation view of the apparatus of FIG. 1.
Figure 7:
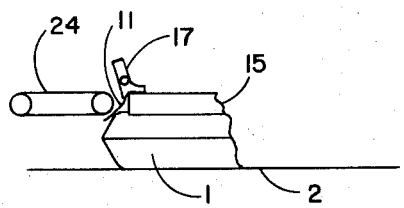
FIG. 7 is a schematic representation of the free end of a length of film-like material being gripped between an object and the movable surface during the operation of the apparatus of the present invention.

The method of the present invention will be described with reference to FIGS. 1 through 7. The method comprises conveying an object in a predetermined path such as that prescribed by conveyor means 2 and object guide track 32. Film-like material 11 is guided from its source to a position where its free end is disposed in the path of the object 1 as shown in FIGS. 1, 3, and 7. As the object 1 traverses its path, it strikes the free end of film 11 as shown in FIG. 7 and the free end of the film is gripped between the upper surface of the object 1 and the movable surface or belt 24. While in this gripping relationship, the object 1 continues to move in its predetermined path, thus pulling a length of film 11 along with it. In a preferred embodiment where the film 11 has been treated with a heat activatable adhesive and the movable surface or belt 24 is heated, the heat transferred from the belt causes the film 11 to adhere to the object 1. If the film 11 is also heat shrinkable and the object has a cavity in it and the film has been adhered to both sides of the cavity, then continued contact with the belt 24 will heat shrink the film thus making it tight and removing wrinkles therefrom.

Further steps in the method of the present invention include severing the requisite length of film from the film strip 11 and leaving the free end of the film in the path of a succeeding object. The severing is accomplished when the object 1 has pulled the desired length of film 11 from roll 10 to actuate the film sensing means 30 which in turn actuates the severing means 27 to drive knife 28 into the film and cut a notch therein and simultaneously brake 29 stops the movement of the film and momentarily holds the film. When brake 29 holds the film while the object 1 with the remaining portion of the film attached firmly thereto continues to move, the film will be snapped at the point where the notch has been cut. The time interval during which the brake holds the film can be controlled by the circuit which actuates solenoid 27. Adjusting the dwell time of a solenoid is well within the skill of the art. This method is especially suitable to heat shrinkable or oriented thermoplastic films in which a tear is readily propagated from a notch or cut. The tears in such film will be clean and straight.

It should be noted that when brake 29 stops film 11, the notch being cut simultaneously is not the same notch which propagates the film tear at that moment. The tear propagating notch is the one cut by the immediately preceding stroke of knife 28 and is located between object 1 and brake 29. The notches, when cut, are always between brake 29 and film roll 10 so that no tension is put on the film portion having the newly made cut or notch.

Referring now to FIG. 4a the method of applying uniform pressure to the carton will be described. The vertical distance, $h$, between the heated belt 24 and conveyor 2 is slightly less than the height of carton 1. Thus, the belt 24 must rise to allow the carton 1 to pass under. To accomplish this, link 6 is provided with slotted pivot race 43 for pivot pin 44. This allows pivot 47 in link 7 to become the pivot around which the entire plate 15 rotates to let belt 24 rise to the carton's height. The pressure on the carton 1 is thus controlled by the pivoted weight of the entire apparatus and the distance from the belt 24 to the pivot 47. Also, since the apparatus is pivotally mounted it is desirable that pivot 47 be located on the center line, C.L., of the film roll 10 so that the balance will not change as the film is consumed.

If the film used in the process of the present invention is heat shrinkable, contact with the heated belt 24 will not only bond a heat activatable adhesively coated film to the object 1, it will also shrink the film. When, as shown in FIG. 7, the upper surface of object 1 strikes the free end of film 11 and brings it into contact with belt 24, the heat from the belt will cause the film to quickly adhere to the surface of the object and the gripping relationship between the belt 24 and the object 1 ensures a good and complete bond between the film and the object. Pivotally mounted arm 17 will swing upwardly as the film is pulled by the motion of object 1. Arm 17 extends across the width of film 11 and, because of the weight of the arm on the film as it is being pulled along, tension is created in the film 11 between the contact point of the object 1 and belt 24 and a contact point of arm 17 and film 11. This ensures a smooth, even flow of material and prevents buckling and backlash of the film. After the film has been severed by the braking action, arm 17 will fall under its own weight against the end of plate 15 thus holding film 11 so that its free end will be in the path of the next object and be ready to be picked up.

The adjustment nut 35 adjusts the gap between the plate 15 and the belt 24 so that the contact point where the object 1 pushes the film 11 into the belt 24 can be adjusted to correspond to the label position when labels are being put upon objects such as egg cartons. Also, to correspond to differing label lengths or object sizes, the position of photoelectric cell 30 and knife 28 may be adjusted.

Additional applications of the method and apparatus

In FIG. 5, a perspective view of one preferred embodiment of the present invention is shown looking from the front of the apparatus. In this illustration, a label 11 is being applied to an egg carton 1 which is carried on conveyor belt 2. As can be seen, the apparatus can fit rather easily onto the discharge conveyor of an egg packing machine. The pivotal mounting of the apparatus allows it to be swung up and out of the way from products which are coming through on the conveyor belt 1 onto which a label is not to be applied.

Figure 8:
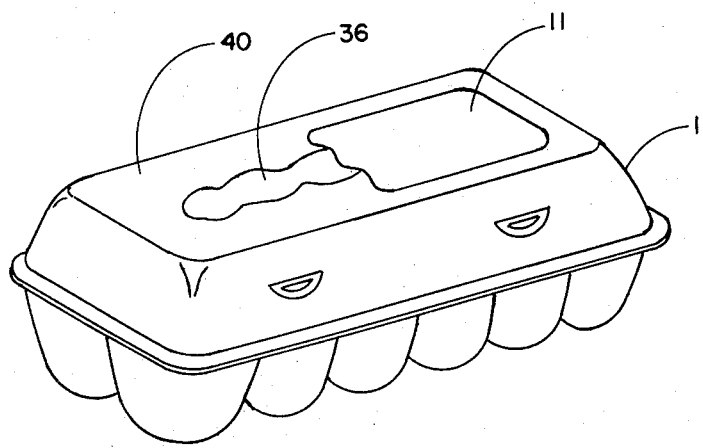
FIG. 8 is the perspective drawing of an egg carton showing film-like material stretched across a cavity in the lid of the carton; and, FIG. 9 is a perspective drawing of a container of objects having a covering of film-like material.

Looking now at FIG. 8, the type of egg carton to which the preferred embodiment of the present invention is particularly applicable is shown. The egg carton 1 has a planar upper surface 40 in which there is a cavity 36 which is covered by the label 11 which is shown in the view of FIG. 8 in a break-away section. The deflate holes which are put into the label allow any air which is trapped in cavity 36 to escape during the heat sealing process. Otherwise, the heated air would tend to make the label 11 balloon out and later, as the air cooled, would make the label 11 sag into the cavity thus creating a very undesirable appearance.

Figure 9:
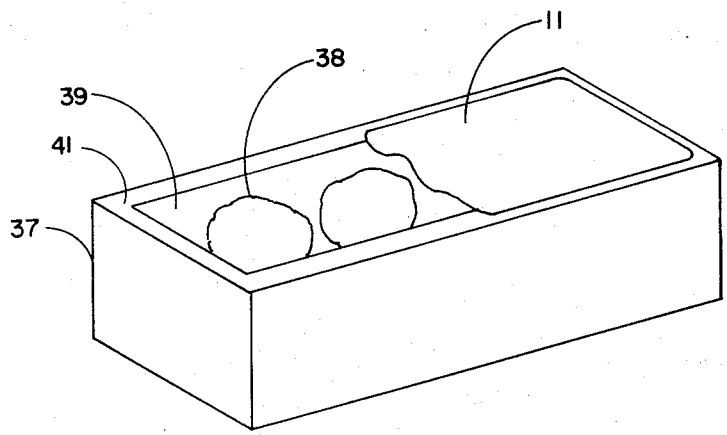

FIG. 9 shows an alternate type of container 37 which may be packaged with objects 38 in cavity 39 and the film 11 is sealed to the planar surface 41 or sides of the cavity. In this instance, the film 11 can act not only as a label, but also as a cover for the objects placed in the cavity.

Having thus described our invention, we claim:
1. Apparatus for applying film-like material to the surface of an object comprising:
 (a) means for conveying said object;
 (b) means for guiding said film-like material to a position over said conveying means where the free end of said material is at least partially in the path of said object on said conveying means;
 (c) movable surface means adjacent said free end of said film whereby when an object traveling on said conveyor means strikes said free end, said free end will be gripped between said object and said movable surface, continued motion of said object applying an additional length of said film-like material to the surface of said object;
(d) means for putting a cut in the edge of said film; and
(e) means for stopping the motion of said film whereby the continued motion of said object with the free end of said film gripped against said movable surface will cause the film to tear and snap at said edge cut.

2. The apparatus of claim 1 including means for perforating said film, thereby providing means to permit air to escape from between the film and the surface to which it is applied.

3. Apparatus for applying film-like material to the surface of objects comprising:
  (a) a conveyor for said objects;
  (b) a horizontal supporting plate, said plate having on its upper surface a film guiding track and on its lower surface an object guiding track, said plate being pivotally supported above said conveyor;
  (c) a rotatable belt adjustably mounted at one end of said plate, the height of the lower run of said belt above said conveyor being less than the height of said objects;
  (d) a source of an indeterminate length of film, said film following said film track and the free end of said film being disposed in the space between said plate and said belt in the path of said objects whereby when an object strikes said free end of said film, said free end will be gripped between said object and said belt;
  (e) means for putting a cut in one edge of said film;
  (f) film braking means; and
  (g) actuating means responsive to information on said film for actuating simultaneously said braking means and said cutting means whereby when said braking means has stopped the movement of said film and said object on said conveyor continues to move with the free end of said film gripped between said object and said belt, the film will be severed at said edge cut.

4. The apparatus of claim 3 including means to rotate and heat said belt.

5. The method of applying film to an object using a movable surface comprising the steps of:
  (a) conveying said object in a predetermined path;
  (b) placing the free end of a length of said film in the path of said object;
  (c) gripping the free end of said film between said movable surface and said object;
  (d) continuing the conveying of said object until the desired length of film has been applied to the surface of said object; and
  (e) severing a predetermined length of said film by putting cuts in the edge of said film and stopping the motion of the film so that a cut is located between the stopped portion of the film and the object, whereby continued motion of the object with the film gripped between said object and said movable surface will sever said film at said cut.

References Cited
UNITED STATES PATENTS

| | | | |
|---|---|---|---|
| 2,291,280 | 7/1942 | Joplin | 156—522 |
| 3,178,329 | 4/1965 | Rohbogner | 156—250 |
| 2,776,068 | 1/1957 | Johnson | 156—522 |
| 2,008,974 | 7/1935 | Weber | 156—516 |
| 2,276,958 | 3/1942 | Goldsmith | 156—522 |
| 3,553,049 | 1/1971 | Wolff | 156—250 |

DOUGLAS J. DRUMMOND, Primary Examiner

U.S. Cl. X.R.

156—265, 355, 362, 521, 522